June 23, 1925. 1,542,831
E. T. PARSONS ET AL
APPARATUS FOR MOLDING DOUGH
Filed June 14, 1923 4 Sheets-Sheet 1
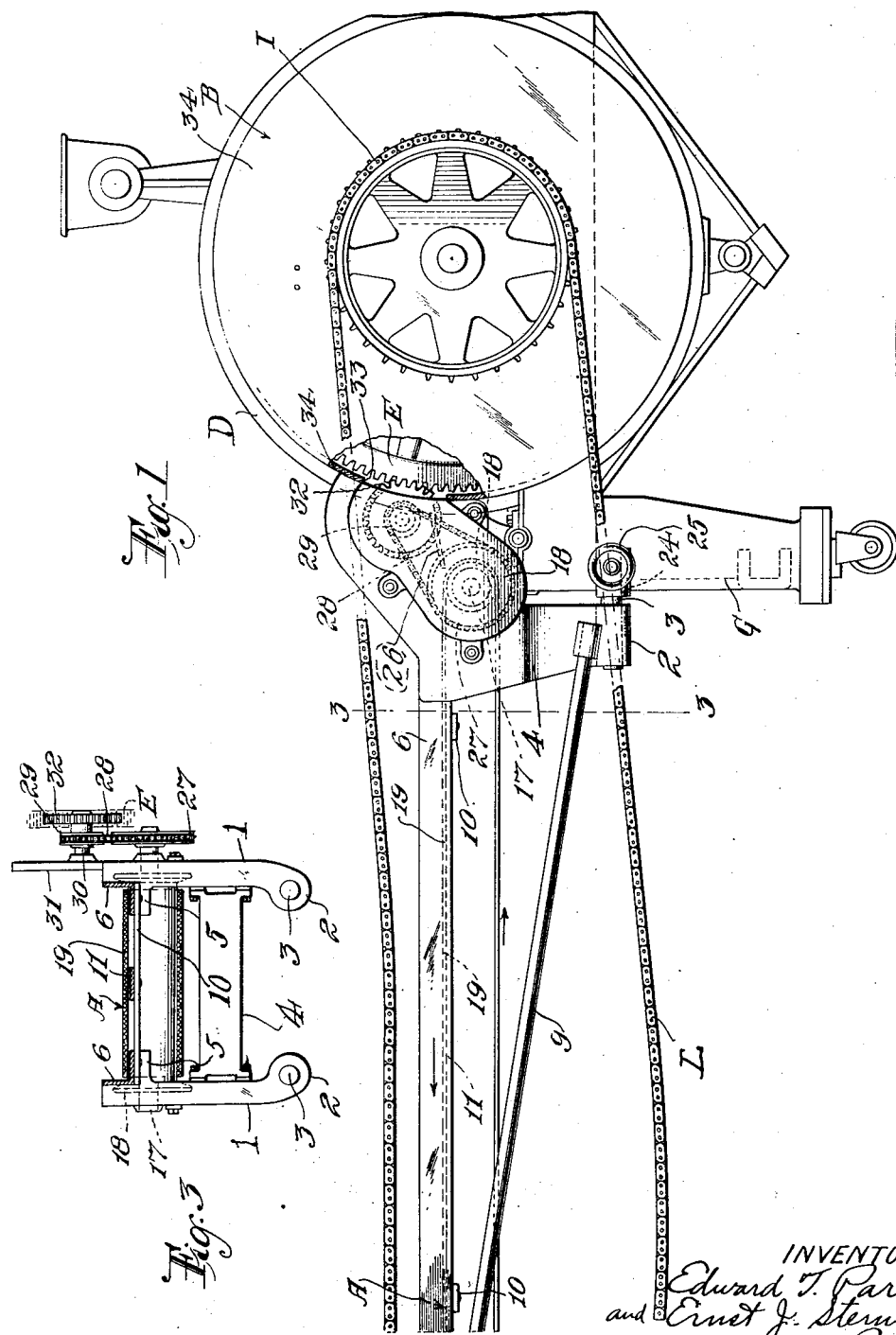

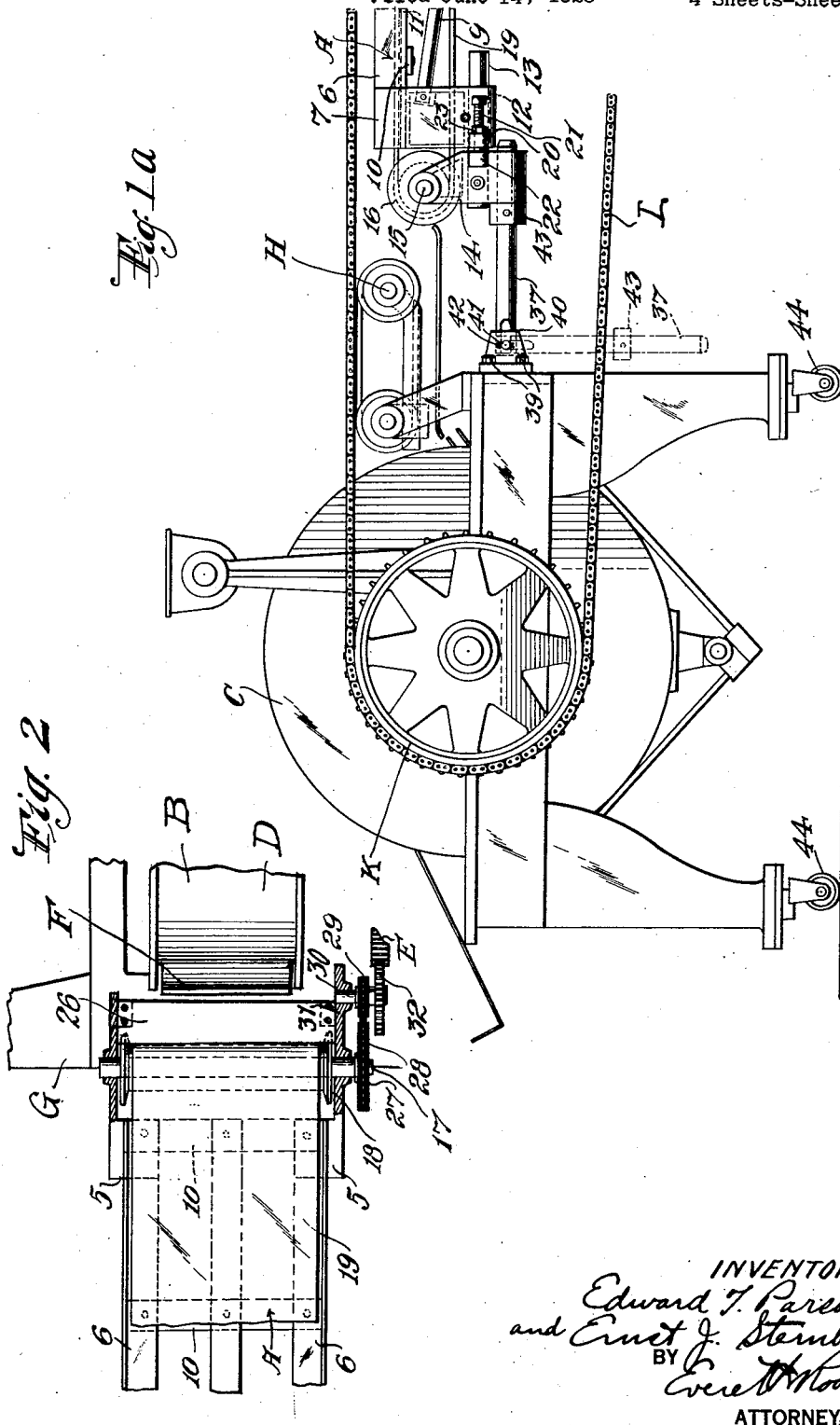

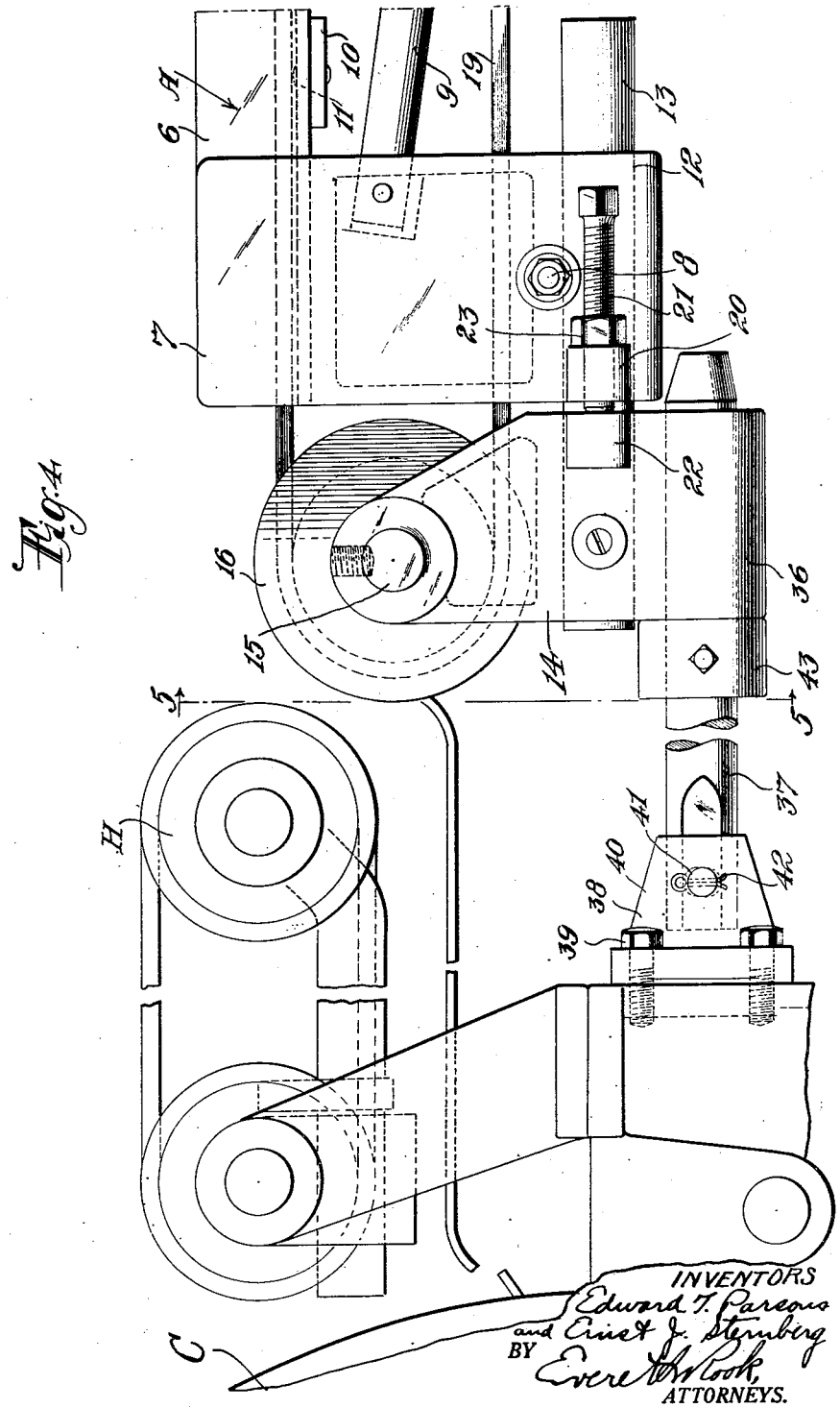

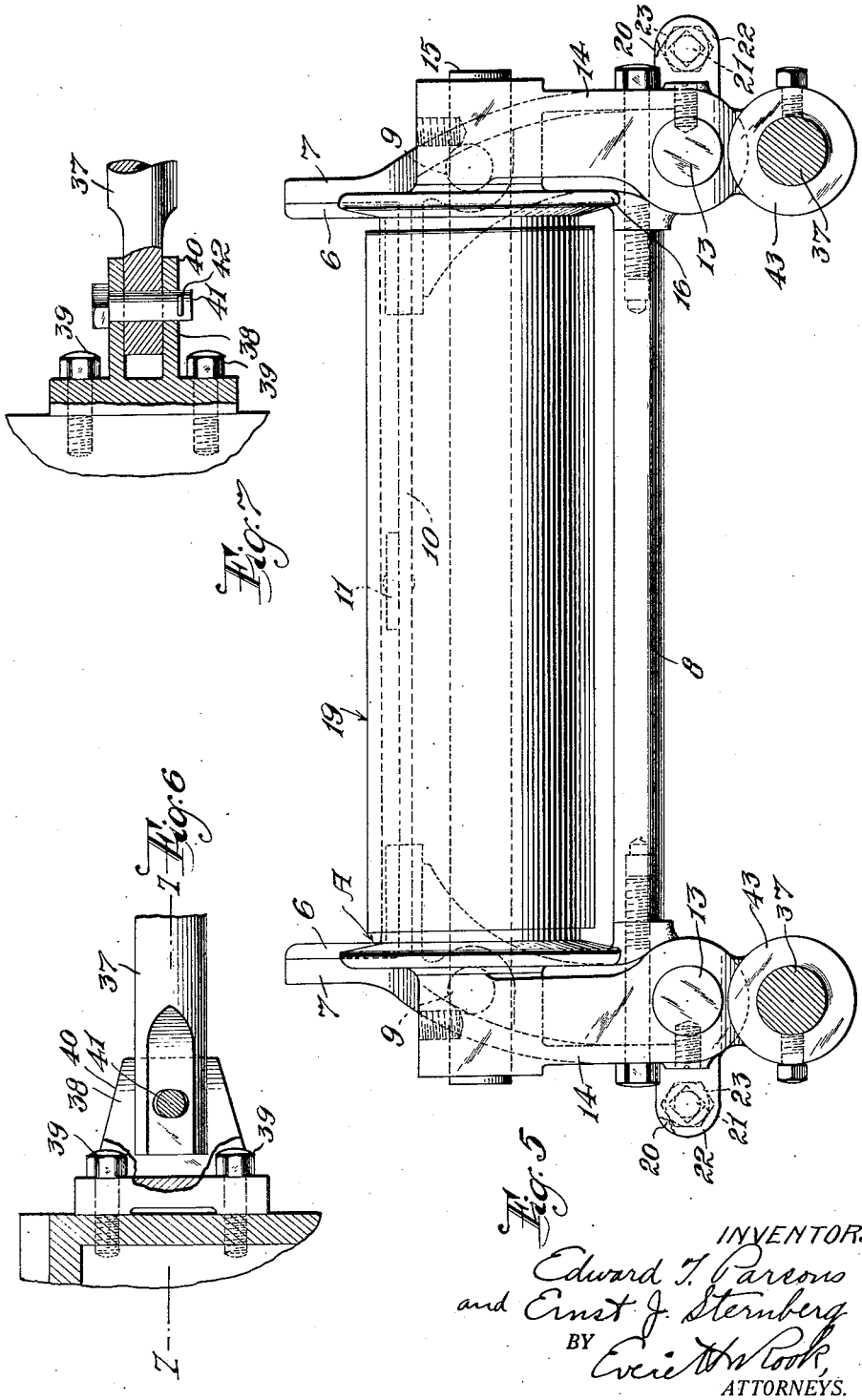

Patented June 23, 1925.

1,542,831

UNITED STATES PATENT OFFICE.

EDWARD T. PARSONS, OF NEWARK, AND ERNST J. STERNBERG, OF LYONS FARMS, NEW JERSEY, ASSIGNORS TO THOMSON MACHINE COMPANY, A CORPORATION OF NEW JERSEY.

APPARATUS FOR MOLDING DOUGH.

Application filed June 14, 1923. Serial No. 645,462.

*To all whom it may concern:*

Be it known that we, EDWARD T. PARSONS and ERNST J. STERNBERG, both citizens of the United States, and residents, respectively, of Newark, in the county of Essex and State of New Jersey, and Lyons Farms, in the county of Union and State of New Jersey, have invented new and useful Improvements in Apparatus for Molding Dough, of which the following is a specification.

It will be understood that when dough is operated upon by a molding machine, the dough is first formed into a sheet and then rolled and kneaded or pressed into a loaf, this rolling and kneading twisting and compressing the dough and squeezing the gases therefrom produced by the yeast, etc. The loaves of dough are frequently operated upon by two or more molding machines, or by a molder and two or more loaf extenders to obtain a loaf of a certain quality or size, the loaf being discharged from one molder immediately and directly into the next molder or extender.

The primary object of our invention is to provide apparatus embodying novel and improved features of construction for molding dough where the dough is operated upon by two or more molding machines, or a molder and one or more loaf extenders, whereby the loaf is permitted to "rest," "recover" or expand for a certain period of time between each of said molding and kneading, or extending operations, thereby enabling the production of bread or the like of improved quality.

Another object of this invention is to provide an improved conveyor mechanism adapted to be mounted on a dough molder, for automatically conveying loaves of dough from the discharge side thereof either to a second molder or a loaf extender, or for the purpose of temporarily supporting the loaves and at the same time gradually moving them away from the molder until they can be placed in pans or otherwise disposed of. In the first-mentioned use the conveyor serves as a "proofing" conveyor whereby a certain amount of time is provided after the first kneading and molding for the loaf to "recover," "rest," or expand before it enters a second molder or extender. In the second-mentioned use the conveyor enables a number of operators to work at the same molder in placing the loaves in pans, so that the loaves can be rapidly "panned" as fast as the molder discharges them, permitting the molder to be operated at full capacity with a minimum number of operators.

Another object is to provide a novel and improved construction whereby a loaf conveyor can be easily and quickly attached to or detached from a loaf molder to serve as a panning conveyor, or attached to or detached from two molders or a molder and an extender to serve as a "proofing" conveyor, the conveyor in each case being directly driven from the main molder and the driving connection being produced simultaneously with the mounting of the conveyor on the molder.

Further objects are to provide a conveyor of this character embodying novel and improved features of construction for connecting one end thereof to a main molder and the other end to a second molder or a loaf extender; to provide such a conveyor with an endless belt and novel and improved means for easily and quickly adjusting the tension on the belt, and to obtain other results and advantages as may be brought out by the following description.

Referring to the accompanying drawings, in which like numerals of reference indicate the same parts throughout the several views, Figure 1 is a side elevation of one end of a loaf conveyor constructed in accordance with our invention, showing the same connected to a loaf molder;

Figure 1ᵃ is a similar view of the other end of the loaf conveyor, showing the same connected to a second molder or loaf extender;

Figure 2 is a top plan view of the receiving end of the loaf conveyor adapted to be connected to the main loaf molder, the gear cover being removed;

Figure 3 is a transverse vertical sectional view taken on the line 3—3 of Fig. 1;

Figure 4 is an enlarged side elevation of the discharge end of the conveyor, showing the same connected to a loaf extender or second molder;

Figure 5 is a transverse vertical sectional view taken on the line 5—5 of Fig. 4;

Figure 6 is a fragmentary vertical sectional view through the hinged connection of the connecting links for the discharge end of the conveyor to the second molder or loaf extender, and Figure 7 is a horizontal sectional view taken on the line 7—7 of Fig. 6.

In the drawings I have shown the loaf conveyor A connected between a main loaf molder B and a second loaf molder or loaf extender C, and the conveyor is used in this manner when it is desired to permit a loaf to rest or recover between two molding operations.

Where the conveyor is to be used as a panning conveyor, it is connected to only a loaf molder or loaf extender, in the manner in which it is shown connected to the molder B. In the form of the invention shown on the drawings, the conveyor receives the loaves from the discharge side of the molder B and carries them to the receiving side of the second molder or extender C, while when the conveyor is used as a panning conveyor the loaves are lifted from the conveyor by the operators and placed in the baking pans or otherwise disposed of.

The conveyor comprises a frame including at one end two end pieces 1, preferably formed of cast metal, formed with arms 2 in which are rigidly secured laterally projecting rods 3. The said end pieces 1 are rigidly connected together by a tie bar 4 and are each provided with a projection 5 to which is connected one end of a side piece 6 which is preferably in the form of angle iron. The frame is provided at the other end with two end pieces 7 connected by means of a tie rod 8 and to which are connected the other ends of the corresponding side pieces 6. Longitudinal truss rods 9 are connected between the arms 4 of the end pieces 1 and the end pieces 7 to brace the frame. The side pieces 6 are connected at spaced points longitudinally thereof with cross pieces 10, and a bar 11 extends substantially longitudinally and centrally of the frame and is rigidly connected to the cross pieces 10.

Each of the end pieces 7 is provided with an opening 12 disposed substantially longitudinally of the frame and adapted to slidably receive a rod 13 carried by a journal block 14 in which is mounted one end of a shaft 15 carrying a roller 16 which extends transversely of the frame. The other end pieces 1 have journaled therein a transverse shaft 17 on which is mounted another roller 18, and an endless conveyor belt 19 is mounted on said rollers 16 and 18 to travel longitudinally of the frame. For adjusting the tension of the belt 19, each of the end pieces 7 is provided at the outer side thereof with a lug 20 in which is threaded a set screw 21, the outer end of which bears against a lug 22 carried by the corresponding journal block 14. Rotation of the set screws 21 in the lugs 20 in one direction will force the journal blocks 14 away from the end pieces 7 to tighten the belt, while rotation of the set screws in the opposite direction will permit the journal blocks to move toward the end pieces 7 to loosen the belt. Jam nuts 23 are preferably provided on the screws 21 to maintain the latter in adjusted position.

The conveyor A is designed to be mounted upon the discharge side of a molder or loaf extender of well-known construction which in the present instance is shown as including a molding drum D driven from a motor (not shown) through a gear E and cooperating with a compresion plate F. The conveyor is also designed to be driven directly from the gear E of the molder drum D. Thus, the leg G at the discharge end of the molder is provided with two spaced openings 24 to slidably receive the rods 3 carried by the arms 4 of the end pieces 1 of the frame. A screw 25 is provided in the frame G to engage one of the rods 3 to maintain the conveyor frame in position on the molder. The conveyor belt 19 is somewhat wider than the drum of the molder, and the roller 18 of the conveyor is so positioned with relation to the frame of the conveyor that it is positioned adjacent the discharge side of the molder when the conveyor is mounted on the latter. A plate 26 extends transversely of the conveyor frame between the receiving end of the conveyor belt and the compression plate F of the molder to guide the loaves from the molder downwardly onto the conveyor 19. It will be understood that the dough is received at one side of the drum D between the drum and the compression plate and is rolled and kneaded along the compression plate to the discharge side where it is automatically deposited by action of gravity from the plate 26 to the conveyor belt.

For driving the conveyor, the shaft 17 is provided with a sprocket 27 which is connected by a chain 28 to a sprocket 29 mounted 29 mounted on a stub shaft 30 rigidly secured to an extension 31 of one of the end pieces 1. The sprocket 29 is riveted or otherwise secured fast to an idler pinion 32 which is adapted to mesh with the gear E of the molder drum D through an opening 33 formed in the gear casing 34 for the gear E. It will thus be seen that with this construction the conveyor belt will be driven directly from the gear E with the upper reach of the belt moving away from the molder in the direction indicated by the arrow on Figure 1. The size of the sprockets 29 and 27 may be varied as desired to obtain the required speed of travel of the belt 19. A gear casing 35 is preferably secured to the extension 31 of the end piece 1 to enclose the idler pinion 32, sprockets 29 and 27 and the chain 28. The idler pinion 32 is so mounted with relation to the frame of the conveyor that when the rods 3 are fitted into the openings 24 of the molder frame, the said idler is brought into mesh with the gear E. Proper meshing of the idler 32 with the gear E may be produced by adjustment of the rods 3 in the openings 24.

Where the conveyor is to be used as a "proofing" conveyor to give the loaves a certain period of time in which to rest or recover between the first molding operation and a second molding operation, the discharge end of the conveyor is connected to a second molder or loaf extender C. For this purpose the journal blocks 14 of the conveyor are provided with openings 36 disposed longitudinally of the conveyor and adapted to slidably receive links 37 one end of each of which is pivotally connected to the frame of the molder C. A pair of pivot brackets 38, one for each of the links 37, is secured to the receiving side of the molder C by any suitable means, such as the bolts 39, the said brackets each comprising a pair of spaced ears 40 between which is arranged the end of the corresponding link 37, which is formed with an elongated opening 41 through which passes a pivot pin 42. Each of the links 37 is provided with a fixed stop collar 43 adapted to be engaged by the corresponding journal block 14. The molder C is preferably provided with casters 44 so that when it is desired to adjust the tension of the belt 19, the screws 21 will force the journal blocks 14 against the collars 43 and move the molder C away from the molder B a distance sufficient to accomplish the desired tightening of the belt 19. The links 37 are normally disposed in an out of the way position with respect to the molder C, as indicated by dotted lines in Figure 1ª, but when it is desired to connect the molder to the conveyor, the links are swung upwardly into substantially horizontal position and slipped into the openings 36, as shown in Figures 1ª and 4. The second molder or loaf extender C may be of any known construction, and is provided with a feeding conveyor H for receiving the loaves by action of gravity from the conveyor belt 19 and guiding the loaves to the molding apparatus of the molder C. The collars 43 on the links 37 provide for accurate positioning of the discharge end of the conveyor belt 19 relative to the conveyor H, and ensure that this relation is always maintained even when the belt 19 is tightened. The molder C may be individually driven, but preferably is driven from the molder B by means of sprockets I and K secured respectively to the drum shafts of the molder B and C and connected by a driving chain L.

The conveyor is of such a length and the speed of travel thereof is such that a predetermined period of time is consumed in the passage of the loaves from the discharge side of the molder B to the receiving side of the second molder C or loaf extender. During this period of time the loaves are permitted to recover, rest or expand so that a product of improved quality is obtained. Where the conveyor is used for panning purposes, a number of operators may be stationed at each side of the conveyor so as to easily and quickly remove the loaves therefrom and place them in pans or otherwise dispose of them, and a second molder C may or may not be connected to the conveyor A, as desired, the rods 3 serving to support the conveyor on the molder B when no second molder is used. In this manner the loaves may be panned or carried away as fast as the molder produces them, whereby the molder may run at full capacity and with a minimum number of operators.

While we have shown and described a conveyor mechanism embodying certain details of construction which are the best now known to us, it will be understood that modifications and changes may be made in the details of construction without departing from the spirit or scope of the invention. Therefore, we do not desire to be understood as limiting ourselves except as required by the following claims when construed in the light of the prior art.

Having thus described the invention, what we claim is:

1. The combination with two dough molding machines, of a conveyor mechanism for automatically conveying the loaf of dough formed by one of said machines from the discharge side thereof to the receiving side of the other of said machines, the ends of said conveyor mechanism and said molding machines being formed with cooperating projections and recesses to detachably mount said conveyor on said machines.

2. The combination with two dough molding machines one of which has a pair of links each pivotally connected at one end thereto, of a conveyor mechanism for conveying a loaf of dough formed by one of said machines from the discharge side thereof to the receiving side of the other of said machines, one end of said conveyor mechanism having a pair of openings each to slidably receive one of said links to mount said end of the conveyor mechanism on said machine, and means for mounting the other end of said conveyor mechanism on the other of said machines.

3. The combination with two dough molding machines one of which has a pair of links each pivotally connected at one end thereto and the other of which is formed with a pair of openings, of a conveyor mechanism for conveying a loaf of dough formed by one of said machines from the discharge side thereof to the receiving side of the other of said machines, one end of said conveyor mechanism having a pair of openings each to slidably receive one of said links to mount said end of the conveyor mechanism on said machine and the other end of said conveyor mechanism being provided with a pair of arms one to slidably fit into each of said openings of said second-mentioned machine to mount said last-mentioned end of the conveyor mechanism on said last-mentioned of said machines.

4. The combination with two dough molding machines one of which has a pair of links each pivotally connected at one end thereof, of a conveyor mechanism for conveying a loaf of dough formed by one of said machines from the discharge side thereof to the receiving side of the other of said machines, one end of said conveyor mechanism having a pair of openings each to slidably receive one of said links to mount said end of the conveyor mechanism on said machine, means for mounting the other end of said conveyor mechanism on the other end of said machines, and means for driving said conveyor mechanism from one of said molding machines.

5. The combination with two dough molding machines one of which has a pair of links each pivotally connected at one end thereof, of a conveyor mechanism for conveying a loaf of dough formed by one of said machines from the discharge side thereof to the receiving side of the other of said machines, one end of said conveyor mechanism having a pair of openings each to slidably receive one of said links to mount said end of the conveyor mechanism on said machine, means for mounting the other end of said conveyor mechanism on the other of said machines, one of said molding machines being also provided with a driving gear, and driving means for conveyor mechanism automatically connected to said driving gear by and simultaneously with the mounting of said conveyor mechanism on the molding machine carrying said driving gear.

6. The combination with two dough molding machines one of which has a pair of links each pivotally connected at one end thereto and the other of which is formed with a pair of openings, of a conveyor mechanism for conveying a loaf of dough formed by one of said machines from the discharge side thereof to the receiving side of the other of said machines, one end of said conveyor mechanism having a pair of openings each to slidably receive one of said links to mount said end of the conveyor mechanism on said machine and the other end of said conveyor mechanism being provided with a pair of arms one to slidably fit into each of said openings of said second-mentioned machine to mount said last-mentioned end of the conveyor mechanism on said last-mentioned one of said machines, one of said molding machines being also provided with a driving gear, and driving means for the conveyor mechanism automatically connected to said driving gear by and simultaneously with the mounting of said conveyor mechanism on the molding machine carrying said driving gear.

7. The combination with two dough molding machines, of a conveyor mechanism for conveying a loaf of dough formed by one of said machines from the discharge side thereof to the receiving side of the other of said machines, said conveyor mechanism including a frame, a pair of journal blocks having a roller journaled therein, one end of said frame and said journal blocks being provided with slidably cooperating projections and recesses to permit said blocks to move longitudinally of said frame, a roller journaled in the other end of said frame, an endless conveyor belt mounted on said rollers, means for driving one of said rollers, said journal blocks and one of said machines having projections and recesses slidably cooperating longitudinally of said conveyor frame to connect one end of said conveyor frame to said machine and permit adjustment of said journal blocks longitudinally of said frame to tighten or loosen said belt without detaching the conveyor frame from said machine, cooperating means on said frame and said journal blocks to so move said blocks, and means for mounting the other end of said conveyor frame on the other of said dough molding machines.

8. The combination with two dough molding machines one of which has a pair of rods thereon, of a conveyor mechanism for conveying a loaf of dough formed by one of said machines from the discharge side thereof to the receiving side of the other of said machines, said conveyor mechanism including a frame, a pair of journal blocks having a roller journaled therein, one end of said frame and said journal blocks being provided with slidably cooperating projections and recesses to permit said blocks to move longitudinally of said frame, a roller journaled in the other end of said frame, an endless conveyor belt mounted on said rollers, means for driving one of said rollers, each of said journal blocks having an opening therein disposed longitudinally of said conveyor frame to slidably receive one of said rods to connect one end of said conveyor frame to said machine and permit adjustment of said journal blocks longitudinally of said frame to tighten or loosen said belt without detaching the conveyor frame from said machine, cooperating means on said frame and said journal blocks to so move said blocks, and means for mounting the other end of said conveyor frame on the other of said dough molding machines.

9. The combination with two dough molding machines, of a conveyor mechanism for conveying a loaf of dough formed by one of said machines from the discharge side thereof to the receiving side of the other of said machines, one end of said conveyor mechanism and one of said machines having slidably cooperating openings and links to mount said end of said conveyor mechanism on said machine, said links being each pivotally mounted at one end on one of said machines and said conveyor mechanism, the other end of said conveyor mechanism and the other of said dough molding machines having cooperating arms and openings to mount said last-mentioned end of said conveyor mechanism on said second-mentioned machine, said arms being fixed, and means for driving said conveyor mechanism.

10. The combination with two dough molding machines, of a conveyor mechanism for conveying a loaf of dough formed by one of said machines from the discharge side thereof to the receiving side of the other of said machines, one end of said conveyor mechanism and one of said machines having slidably cooperating openings and links to mount said end of said conveyor mechanism on said machine, said links being each pivotally mounted at one end on one of said machines and said conveyor mechanism, the other end of said conveyor mechanism and the other end of said dough molding machines having cooperating arms and openings to mount said last-mentioned end of said conveyor mechanism on said second-mentioned machine, said arms being fixed, said second-mentioned machine having a gear thereon, and driving means for said conveyor mechanism on the second-mentioned end of said conveyor frame to directly connect with said gear simultaneously with the connection of the second-mentioned end of said conveyor mechanism to said second-mentioned machine.

EDWARD T. PARSONS.
ERNST J. STERNBERG.